United States Patent
Chen et al.

(10) Patent No.: US 11,347,418 B2
(45) Date of Patent: May 31, 2022

(54) METHOD, DEVICE AND COMPUTER PROGRAM PRODUCT FOR DATA PROCESSING

(71) Applicant: EMC IP Holding Company LLC, Hopkinton, MA (US)

(72) Inventors: Xiao Chen, Shanghai (CN); Alex Pengbo Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 40 days.

(21) Appl. No.: 16/457,043

(22) Filed: Jun. 28, 2019

(65) Prior Publication Data

US 2020/0249840 A1    Aug. 6, 2020

(30) Foreign Application Priority Data

Jan. 31, 2019 (CN) .......................... 201910103572.5

(51) Int. Cl.
  *G06F 12/00*    (2006.01)
  *G06F 3/06*    (2006.01)

(52) U.S. Cl.
  CPC ............ *G06F 3/064* (2013.01); *G06F 3/0619* (2013.01); *G06F 3/0689* (2013.01)

(58) Field of Classification Search
  CPC ....... G06F 3/0619; G06F 3/0689; G06F 3/064
  See application file for complete search history.

(56) References Cited

U.S. PATENT DOCUMENTS

| | | | | |
|---|---|---|---|---|
| 8,832,528 | B2* | 9/2014 | Thatcher | G06F 11/073 |
| | | | | 714/766 |
| 9,026,729 | B1* | 5/2015 | Hallak | G06F 11/1076 |
| | | | | 711/114 |
| 10,185,507 | B1* | 1/2019 | Olson | G06F 3/061 |
| 10,466,913 | B2* | 11/2019 | Bonwick | G06F 11/1076 |
| 2003/0033308 | A1* | 2/2003 | Patel | G06F 16/10 |
| 2003/0135514 | A1* | 7/2003 | Patel | G06F 11/1435 |
| | | | | 707/999.102 |
| 2004/0123223 | A1* | 6/2004 | Halford | G06F 11/1076 |
| | | | | 714/781 |
| 2004/0153479 | A1* | 8/2004 | Mikesell | H04N 21/2318 |
| 2011/0231734 | A1* | 9/2011 | Yano | G06F 3/0679 |
| | | | | 714/764 |

(Continued)

*Primary Examiner* — Shawn X Gu
*Assistant Examiner* — Mohammad S Hasan
(74) *Attorney, Agent, or Firm* — Amin, Turocy & Watson, LLP

(57) ABSTRACT

Data processing techniques comprise, in response to determining that a storage unit storing first data blocks is damaged, determining storage units associated with the storage unit, and obtaining second data blocks from the storage units, where the second data blocks and the first data blocks are generated by applying to data an error correction code in a first format. The method further comprises recovering the first data blocks based on the second data blocks. In addition, the method comprises generating error correction blocks by applying an error correction code in a second format to the recovered first data blocks, where the second format is different from the first format. The above techniques can reduce input/output operations and shortens the recovery time of data blocks, and further can reduce the risk of data loss even in an extremely bad situation.

20 Claims, 7 Drawing Sheets

(56) References Cited

U.S. PATENT DOCUMENTS

| | | | |
|---|---|---|---|
| 2012/0059990 A1* | 3/2012 | Iida | G06F 11/2082 |
| | | | 711/E12.019 |
| 2012/0127818 A1* | 5/2012 | Levy | G06F 13/16 |
| | | | 365/230.03 |
| 2012/0151166 A1* | 6/2012 | Suto | G06F 3/064 |
| | | | 711/162 |
| 2017/0242745 A1* | 8/2017 | Sherlock | G06F 11/0727 |
| 2019/0042369 A1* | 2/2019 | Deutsch | G06F 21/6218 |
| 2019/0050298 A1* | 2/2019 | Na | G06F 11/1469 |
| 2019/0205205 A1* | 7/2019 | Johnson | G06F 12/023 |
| 2019/0310923 A1* | 10/2019 | Jun | G06F 11/27 |
| 2019/0361606 A1* | 11/2019 | Goker | H03M 13/2918 |
| 2020/0042390 A1* | 2/2020 | Roberts | G06F 11/2094 |

\* cited by examiner

METHOD, DEVICE AND COMPUTER PROGRAM PRODUCT FOR DATA PROCESSING

RELATED APPLICATION

The present application claims the benefit of priority to Chinese Patent Application No. 201910103572.5, filed on Jan. 31, 2019, which application is hereby incorporated into the present application by reference herein in its entirety.

FIELD

Embodiments of the present disclosure generally relate to the field of data management, and more specifically, to a method, a device and a computer program product for processing data.

BACKGROUND

With rapid development of information technology, the amount of data needs to be stored become larger and larger. In order to store the data, various storage devices with large capacity are developed. To improve both storage efficiency and utilization efficiency of the data, designers have developed various platforms, hardware components and software components so as to accelerate processing of the data.

In order to ensure data safety, during a process of storing data, the data is typically stored in a redundant manner. As such, when a part of the data is lost, it can still be recovered with the redundant data. A multi-copy policy is adopted at an initial data backup, which brings about low utilization rate of disks. Nowadays, with development of error correction code technology, the error correction code is increasingly used to store massive data. However, there are still a lot of problems to be tackled when the error correction code is used for storing data.

SUMMARY

Embodiments of the present disclosure provide a method, a device and a computer program product for processing data.

In accordance with a first aspect of the present disclosure, there is provided a method for processing data. The method comprises, in response to determining that a storage unit storing a first plurality of data blocks is damaged, determining a plurality of storage units associated with the storage unit. The method also comprises obtaining a second plurality of data blocks from the plurality of storage units, the second plurality of data blocks and the first plurality of data blocks being generated by applying to data an error correction code in a first format. The method further comprises recovering the first plurality of data blocks based on the second plurality of data blocks. In addition, the method comprises generating a plurality of error correction blocks by applying an error correction code in a second format to the recovered first plurality of data blocks, and the second format is different from the first format.

In accordance with a second aspect of the present disclosure, there is provided an electronic device for processing data. The electronic device comprises: a processor; and a memory having computer program instructions stored thereon, the computer program instructions, when executed by the processor, causing the electronic device to perform acts comprising: in response to determining that a storage unit storing a first plurality of data blocks is damaged, determining a plurality of storage units associated with the storage unit; obtaining a second plurality of data blocks from the plurality of storage units, the second plurality of data blocks and the first plurality of data blocks being generated by applying to data an error correction code in a first format; recovering the first plurality of data blocks based on the second plurality of data blocks; and generating a plurality of error correction blocks by applying an error correction code in a second format to the recovered first plurality of data blocks, the second format being different from the first format.

In accordance with a third aspect of the present disclosure, there is provided a computer program product being tangibly stored on a non-volatile computer-readable medium and comprising machine-executable instructions which, when executed, cause a machine to perform steps of the method in the first aspect of the present disclosure.

BRIEF DESCRIPTION OF THE DRAWINGS

Through the following detailed description on the example embodiments of the present disclosure with reference to the accompanying drawings, the above and other objectives, features, and advantages of the present disclosure will become more apparent, in which the same reference symbols refer to the same components.

In each drawing, the same or corresponding reference symbols represent the same or corresponding components.

DETAILED DESCRIPTION OF EMBODIMENTS

Figure 1:
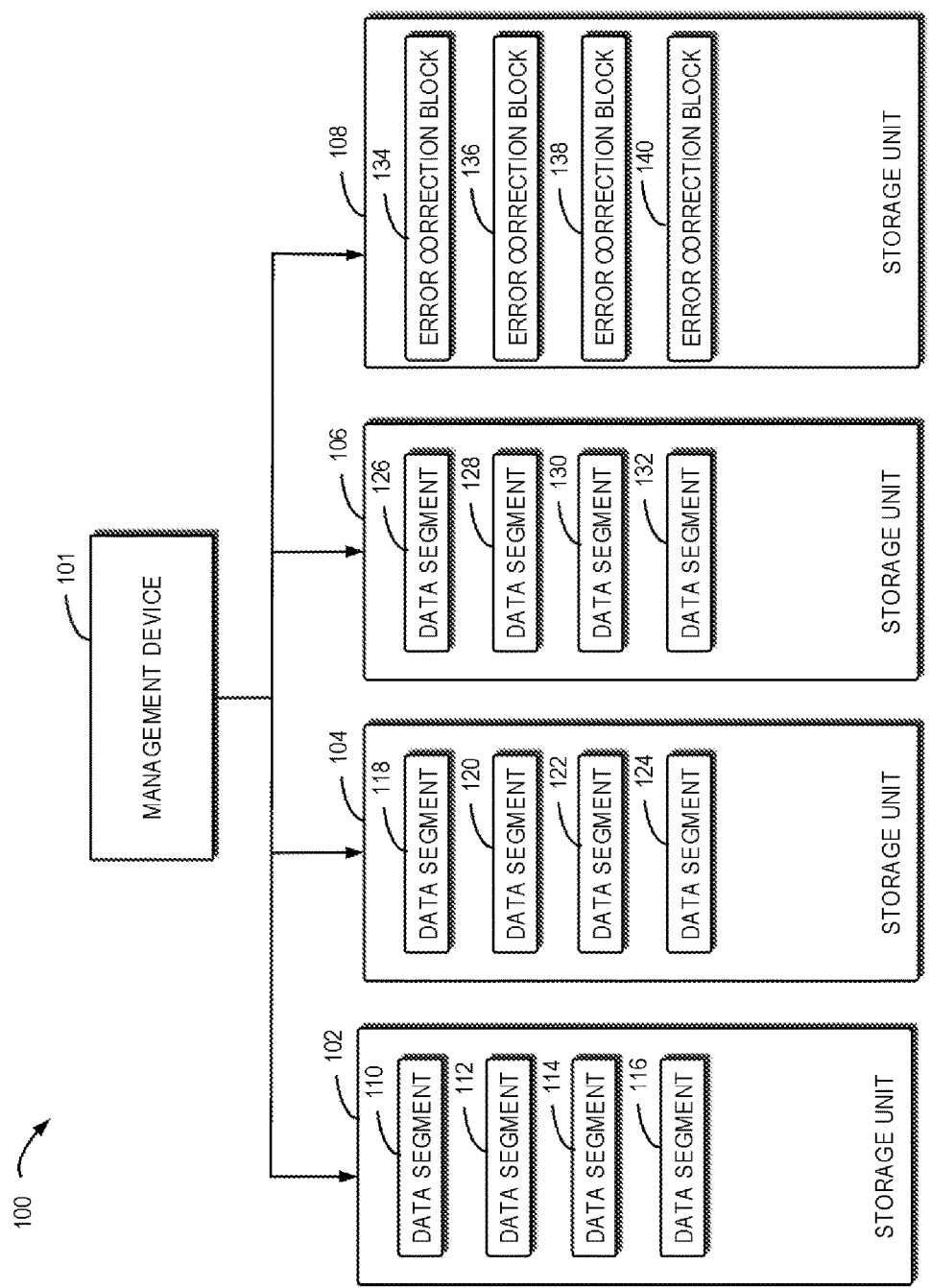
FIG. 1 illustrates a schematic diagram of an example environment 100 in which a device and/or method according to embodiments of the present disclosure can be implemented.

The embodiments disclosed herein will now be described with reference to the accompanying drawings. Although the drawings illustrate some embodiments of the present disclosure, it would be appreciated that the present disclosure can be implemented in various forms but cannot be construed as being limited by the embodiments described herein. Rather, these embodiments are provided to disclose the present disclosure more thoroughly and completely. It would be appreciated that drawings and embodiments of the present disclosure are only provided as examples, but not used to limit protection scope of the present disclosure.

As used herein, the term "includes" and its variants are to be read as open-ended terms that mean "includes, but is not limited to." The term "based on" is to be read as "based at least in part on." The term "one embodiment" or "the embodiment" is to be read as "at least one embodiment." The terms "first," "second," and the like may refer to different or same objects. Other definitions, explicit and implicit, may be included below.

Principles of the present disclosure will be described below with reference to several example embodiments as shown in the drawings. Although the drawings illustrate the preferred embodiments described herein, these embodiments are described only to enable those skilled in the art to better understand and further implement the present disclosure, but not used to limit the protection scope of the present disclosure in any manner.

During storing of the data, a storage device stores the data (for example, 128 M) in a predetermined storage space. In order to ensure data safety, error correction code is applied to the data. There are two parameters for the error correction code format: a first parameter k and a second parameter m, the k represents the number of data segments into which the data are divided, and the m represents the number of error correction blocks generated when encoding the divided k data segments. For ease of description, the error correction code format is represented in a form of k+m.

Typically, the data segments and the error correcting blocks, after generated by applying to data an error correction code, are stored into a plurality of storage units. For ease of description, the stored data segments and error correcting blocks are collectively referred to as data blocks. Due to constraint of the error correction code format, at most m data blocks are allowed to be damaged among the data blocks generated by the error correction code format. In order to ensure that data can be recovered when the storage units are damaged, each storage unit stores thereon at most m data blocks.

In conventional solution, when a storage unit is damaged, data segments and error correction blocks stored on other storage units are used to recover the data segments on the damaged storage unit. Since it is required to first store the newly recovered data segments on other storage units, in order to ensure recoverability of the data, there arises a need of recalculating error correction blocks for all of the data segments. Then, the recovered data segments and the recalculated error correction blocks are rewritten into the storage unit. However, these operations will lead to massive input/output (I/O) operations. Considering recovery speed is restricted by available I/O bandwidth, the I/O load is relatively high. If data amount is large, the data are recovered more slowly, causing a higher risk of data loss.

In addition, in a process of moving the recovered data segments back to a newly added storage unit or the original storage unit available again it is further required to recalculate the error correction blocks for the data segments of the data and then store the same. Since a large number of I/O operations are involved and there is massive data to be processed, it costs both time and resources to adjust speed of the error correction code. Therefore, in the conventional solution, a process of recovering data and storage units consumes both time and resource, and probably increases risk of data loss.

In order to solve the above problem, the present disclosure provides a method of processing data. In this method, when a storage unit fails, data blocks on the failed storage unit are recovered with data blocks on other storage units. Then, only the recovered data blocks are encoded with a second encoding format to generate a parity block. The recovered data blocks and the parity block are stored on undamaged storage units. When there is a new storage unit, it is only required to move the recovered data blocks from the undamaged storage units to the new node. As such, the method can reduce the number of I/Os involved in the process of recovering data and storing the data to a new node, and improve the data processing efficiency and safety.

Hereinafter, FIG. 1 illustrates an example environment 100 in which a device and/or method according to embodiments of the present disclosure can be implemented.

The computing environment 100 includes a management device 101. The management device 101 is a device or component for managing data on storage units, for example, reading, writing and encoding the data, and the like. The storage units, when storing data, process data using an error correction code format. Based on the error correction code format, the data to be stored are divided into a plurality of data segments, and then, the data segments are encoded using the error correction code to generate error correction blocks. Subsequently, the data segments and error correction blocks are stored on a plurality of storage units. For ease of description, the data segments and the error correction blocks sometimes are collectively referred to as data blocks. Due to restriction of the error correction code format, the number of data blocks stored on each storage unit does not exceed the number of the error correction blocks.

The management device 101 can be used to determine whether a storage unit is damaged. When unable to obtain data on a certain storage unit, the management device 101 determines the storage unit as a damaged. In an example, damage to a disk associated with the storage unit causes damage to the storage unit. In another example, damage to a track associated with data blocks will cause damage to the storage unit. In a further example, unable to read data on the storage unit due to a software program may also be regarded as a damage to the storage unit. The above examples are provided only for illustration, rather than suggesting specific limitations on the scope of the present disclosure. Those skilled in the art would determine, if necessary, damage of reading data on the storage unit as damage to the storage unit.

When determining a storage unit is damaged, the management device 101 will recover, based on the error correcting format, the data blocks on the storage unit using data blocks stored on other storage units. Then, the recovered data blocks are stored on other storage units. When there is an available storage unit, the recovered data blocks are stored into the new storage unit, and the recovered storage blocks stored on other storage units are removed.

The computing environment 100 further includes a plurality of storage units connected with the management device 101. The storage units each are a storage space for storing data, which may be physical storage units for storing data, or may also be logic storage units. When the storage units are logic storage units, the storage units may be mapped to a disk, in an example. In another example, the storage units are mapped to a plurality of disks. In a further example, the storage units are mapped to a track. The above examples are provided only for illustration, rather than suggesting any specific limitation on the scope of the present disclosure. According to needs, those skilled in the art may set mapping relations between the storage units and the disk or other physical storage devices.

FIG. 1 shows a storage unit 102, a storage unit 104, a storage unit 106 and a storage unit 108 connected with the management device 101. The example is provided only for illustration, rather than suggesting any specific limitation on the scope of the present disclosure. Those skilled in the art may set the number of storage units connected with the management device 101, according to needs.

The data to be stored are typically divided into a plurality of data segments, and then, the plurality of data segments are encoded using error correction code in a predetermined format, to generate error correction blocks. In the example as shown in FIG. 1, a 12+4 error correcting format is applied to the data to be stored. The data to be stored (for example, the size thereof is 128 M) is divided into 12 data segments, and 4 error correction blocks are generated. The above example is provided only for illustration, rather than suggesting any specific limitation to the scope of the present disclosure. Those skilled in the art would set any appropriate error correction code format according to needs, for example, a 12+6 format, or a 4+2 format.

The plurality of data segments and error correction blocks generated using the error correction code format are stored on a plurality of storage units. In order to ensure recoverability of the data, the number of data segments and/or the error correction blocks stored on each storage unit cannot exceed the number of the error correction blocks.

The number of storage units may be set to several based on the error correcting format. In an example, when the error correction code format is 12+4, the number of the storage units is a multiple of 4. Alternatively or additionally, there are 4 storage units. Each storage unit includes 4 data segments and/or error correction blocks, as shown in FIG. 1. The example is provided only for illustration, rather than suggesting any specific limitation to the scope of the present disclosure. Those skilled in the art may set the number of the storage units, and the number of data segments and/or error correction blocks stored on each storage unit, according to needs.

In the example of FIG. 1, when the error correction code in the 12+4 format is used, 12 data segments and 4 error correction block are respectively stored on four storage units, specifically: the storage unit 102 stores a data segment 110, a data segment 112, a data segment 114 and a data segment 116; the storage unit 104 stores a data segment 118, a data segment 120, a data segment 122 and a data segment 124; the storage unit 106 stores a data segment 126, a data segment 128, a data segment 130 and a data segment 132; and the storage unit 108 stores an error correction block 134, an error correction block 136, an error correction block 138 and an error correction block 140.

The data segments and the error correction blocks may be stored on the storage units in any appropriate manner. In an example, a part of the plurality of storage units is used for storing the data segments, while a further part of the storage units is used for storing the error correction blocks. In a further example, a storage unit may store both the data segments and error correction blocks. The above examples are provided only for illustration, rather than suggesting any specific limitation to the scope of the present disclosure.

When a storage unit is damaged, the data blocks on the damaged storage unit may be recovered using data blocks stored on other storage units. As the example shown in FIG. 1, if the storage unit 106 is damaged, the data blocks on the storage unit 106 may be recovered by decoding, using the error correction code, the data blocks on the storage unit 102, the storage unit 104 and the storage unit 108.

The management device 101 may apply to the recovered data blocks an error correction code in a second format, to generate error correction code with respect to the received data block. As shown in FIG. 1, the recovered data blocks are four data blocks which may be stored on the storage unit 102 and the storage unit 104. At this time, the error correction code in a second format 4+2 may be used to encode the four data blocks, to generate two error correction blocks. The recovered data blocks are stored on the storage unit 102 and the storage unit 104, and the generated two error correction blocks are stored on the storage unit 108. When a new storage unit is added or an original storage unit is recovered to be available, the data blocks on the storage unit 102 and the storage unit 104 are directly stored into the available storage units. Then, the data blocks or error correction blocks on the storage unit 102 and the storage unit 104 are removed.

Figure 2:
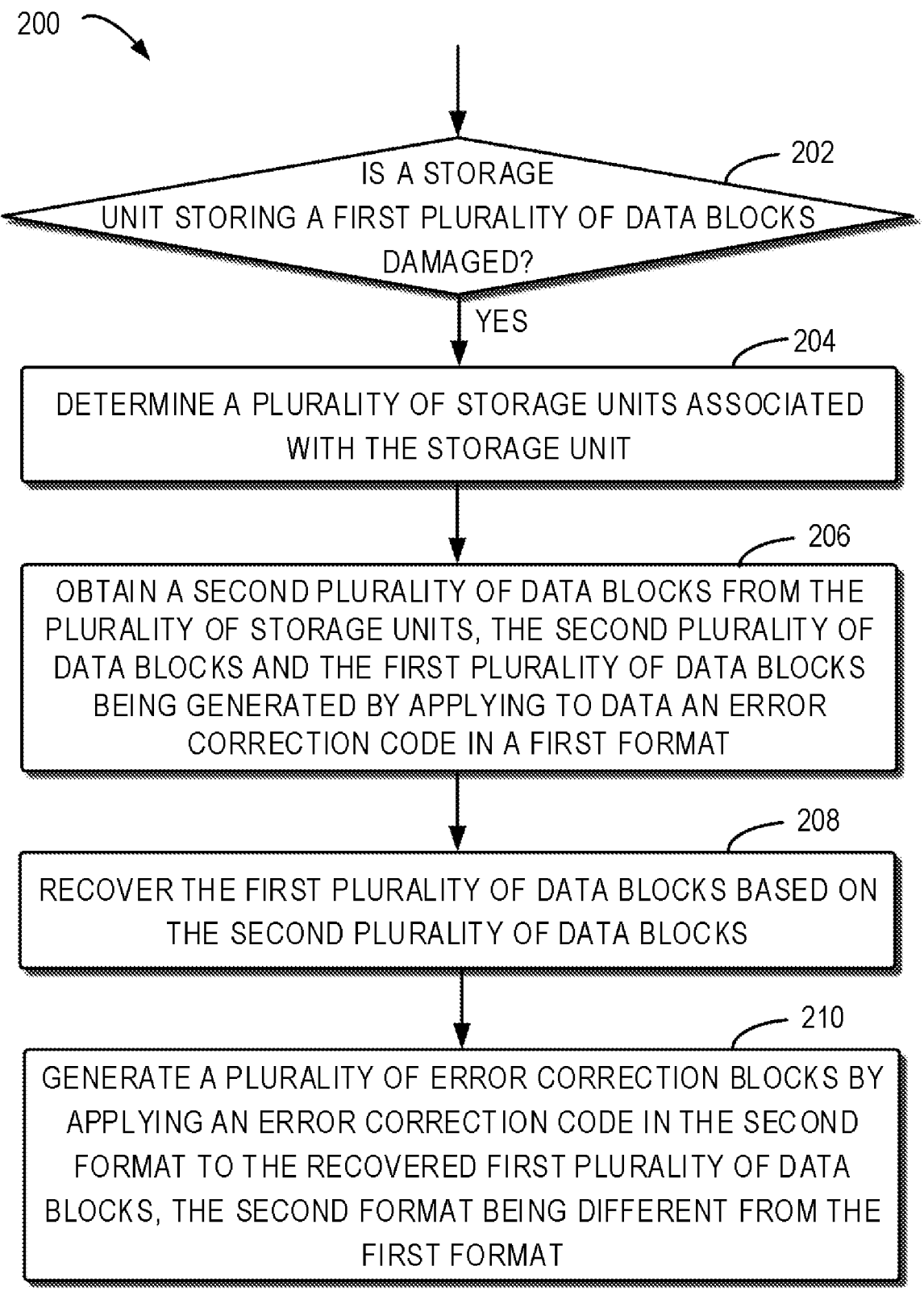
FIG. 2 illustrates a flowchart of a method 200 of processing data according to embodiments of the present disclosure.
Figure 4A:
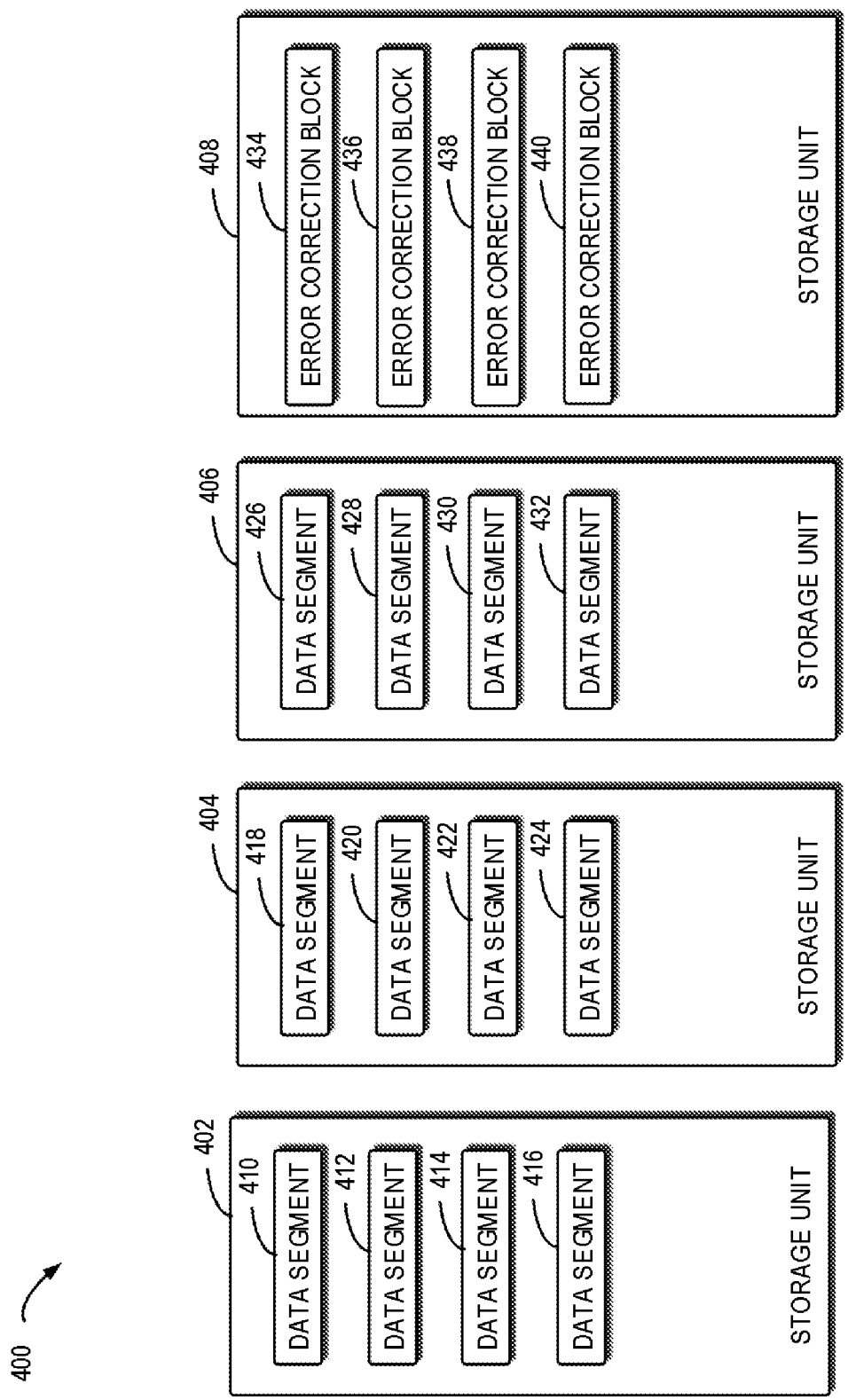
FIGS. 4A-4C illustrate schematic diagrams of data processing according to embodiments of the present disclosure.

Referring to FIG. 1, a system environment 100 for processing data has been shown, and a method of processing data will be detailed with reference to FIG. 2 and FIGS. 4A-4B. It would be appreciated that the method of FIG. 2 may be performed by the management device 101, or may be performed by other appropriate device.

When the error correction code in the first format is used for encoding data to be stored, the data to be stored is typically divided into a plurality of data segments according to the first error correction code format. Then, error correction blocks are generated by encoding with an error correction code in a predetermined format to the plurality of data segments. In the example of FIG. 4A, the error correction code format 12+4 is employed to process 128 M data. The data to be stored is divided into 12 data blocks. 4 error correction blocks are generated based on the 12 data blocks. The above example is provided only for illustration, rather than suggesting any specific limitation to the scope of the present disclosure. Those skilled in the art would employ any appropriate error correction code format according to needs, for example, 12+6 or 4+2.

Subsequently, the data segments and the error correction blocks are stored on a plurality of storage units. In order to ensure recoverability of the data, the number of data blocks stored on each storage unit is not allowed to exceed the number of error correction blocks. For example, in the error correcting format 12+4, the number of data blocks stored on each storage unit cannot exceed 4. At this time, the number of the storage units is a multiple of 4. Preferably, the number of storage units is 4, as shown in FIG. 4A.

In one example, the data segments and the error correction blocks are stored on different storage units, respectively. In another example, the data segments and the error correction blocks may be stored on the same storage unit. Alternatively or additionally, the data segments and the error correction blocks are stored evenly on a plurality of storage units.

As an example, in FIG. 4A, 12 data segments are stored evenly on three storage units, specifically as follows: a storage unit 402 stores a data segment 410, a data segment 412, a data segment 414 and a data segment 416; a storage unit 404 stores a data segment 418, a data segment 420, a data segment 422 and a data segment 424; and a storage unit 406 stores a data segment 426, a data segment 428, a data segment 430 and a data segment 432. An error correction block 434, an error correction block 436, an error correction block 438 and an error correction block 440 generated from the 12 data segments are stored in a storage unit 408. The example is provided only for illustration, rather than suggesting any specific limitation to the scope of the present disclosure. Those skilled in the art would arrange the data segments and the error correction blocks on a storage unit, according to needs. For ease of description, the data segments and error correction blocks stored using error correction code sometimes are collectively referred to as data blocks.

At block 202, it is determined whether a storage unit storing a first plurality of data blocks is damaged. In one example, damage to a disk corresponding to the storage unit will cause damage to the storage unit. In another example, damage to a track corresponding to the storage unit will lead to damage to the storage unit. In a further example, when a system associated with storage units fails to obtain the data of the storage unit, the storage unit is viewed as damaged. The above examples are provided only for illustration, rather than suggesting any specific limitation to the scope of the present disclosure. Any situation when the data cannot be obtained on a storage unit will cause damage to the storage unit.

At block 204, a plurality of storage units associated with the storage unit are determined. Since the data processed using the error correction code in the first format are stored in different storage units, storage units storing other data blocks can be obtained when the storage unit is damaged. For example, as shown in FIG. 4B, when the storage unit 406 is damaged, the storage unit 402, storage unit 404 and storage unit 408 associated with the storage unit 406 may be determined.

At block 206, a second plurality of data blocks are obtained from a plurality of storage units, and the second plurality of data blocks and the first plurality of data blocks are generated by applying to the data an error correction code in the first format. Since the associated data blocks using the error correction code format are distributed over different storage units, other data blocks may be obtained from a set of associated storage units. As shown in FIG. 4B, the data segment 410, the data segment 412, the data segment 414 and the data segment 416 may be obtained from the storage unit 402; the data segment 418, the data segment 420, the data segment 422 and the data segment 424 may be obtained from the storage unit 404; and the error correction block 434, the error correction block 436, the error correction block 438 and the error correction block 440 may be obtained from the storage unit 408.

At block 208, the first plurality of data blocks are recovered based on the second plurality of data blocks. Since the obtained data blocks are encoded using the error correction format, the first plurality of data blocks are decoded during the recovery process, using the error correction code in the first format, to obtain the recovered data blocks. During the error correction code decoding process, various appropriate conventional decoding methods corresponding to the error correction code in the first format are feasible.

Figure 4B:
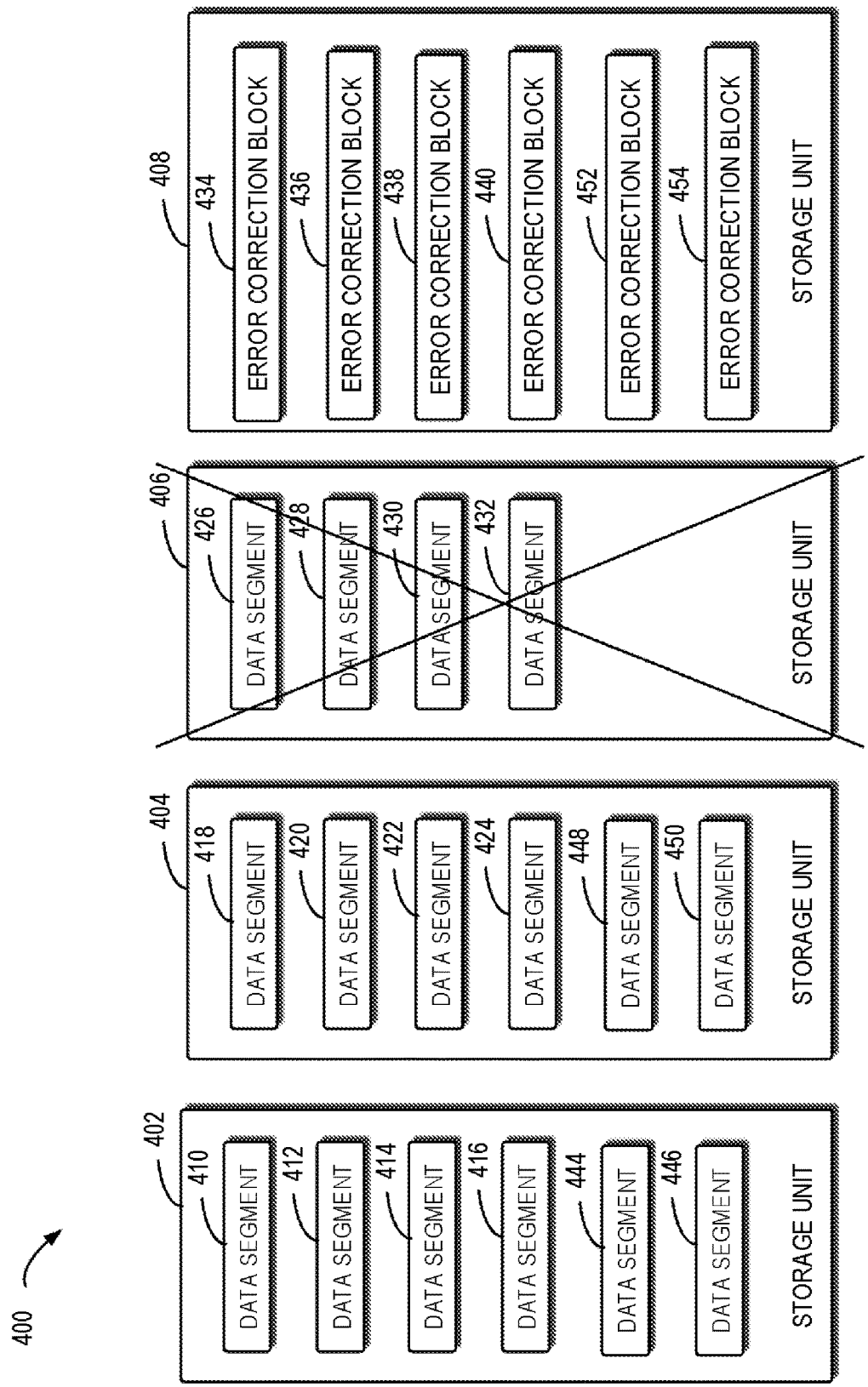

In the example as shown in FIG. 4B, since the error correction code in the 12+4 format is used for the storage data blocks, the error correction code in the 16+4 format can be used to decode the data blocks of the storage unit 402, the storage unit 404 and the storage unit 408, to recover the data blocks on the storage unit 406. In this example, the data segment 444 and the data segment 446 on the storage unit 402, and the data segment 448 and the data segment 450 on the storage unit 404 are recovered data segments.

At block 210, a plurality of error correction blocks are generated by applying the error correction code in the second format to the recovered first plurality of data blocks, and the second format is different from the first format. After obtaining the recovered data segments, different from the conventional solution in which an error correction code is applied to all data segments, the present disclosure only apply the error correction code in the second format to the recovered data blocks.

In the example as shown in FIG. 4B, the encoding format 4+2 is applied to the recovered data segments 444, 446, 448 and 450, to obtain two error correction blocks 452 and 454. The above example is provided only for illustration, rather than suggesting any specific limitation to the scope of the present disclosure. Those skilled in the art would employ any appropriate error correction code for the recovered data blocks, according to needs.

By means of the above process, the data blocks of the damaged data unit are recovered. By applying the second error correction code encoding format only to the recovered data blocks, the method reduces the number of write I/Os and the stored data amount and improves the data processing efficiency when storing the recovered data blocks and the error correction blocks.

Additionally or alternatively, in some embodiments, the recovered first plurality of data blocks and a plurality of error correction blocks may be stored in a plurality of storage units. The number of the data blocks and the error correction blocks in the storage unit from the plurality of storage units does not exceed a threshold number. The threshold number is determined based on the format of the error correction code. In one example, the threshold number is a sum of the number of the error correction blocks in the first error correction code format and the number of the error correction blocks in the second error correction code format.

In the example as shown in FIG. 4B, the recovered data segments 444, 446, 448 and 450 are stored on the storage units 402 and 404. The error correction block 452 and the error correction block 454 are obtained by applying to the four data segments the error correction code in the 4+2 format. The two error correction blocks are stored on the storage unit 408. The above example is provided only for illustration, rather than suggesting any specific limitation to the scope of the present disclosure.

As compared with the conventional solution, the above embodiment reduces time for recovering the damaged data blocks, and further lowers the risk of data loss in this circumstance. For example, after the data segments of the storage unit in the 12+4 format are recovered, it is only required to store 6 data blocks in the present disclosure. In contrast, it is required to store 10 data blocks if all of the data segments are encoded again using the 12+6 format. That is, when the number of the real-time storage units is reduced from 4 to 3, the solution thereto can save 40% of write I/Os.

Figure 3:
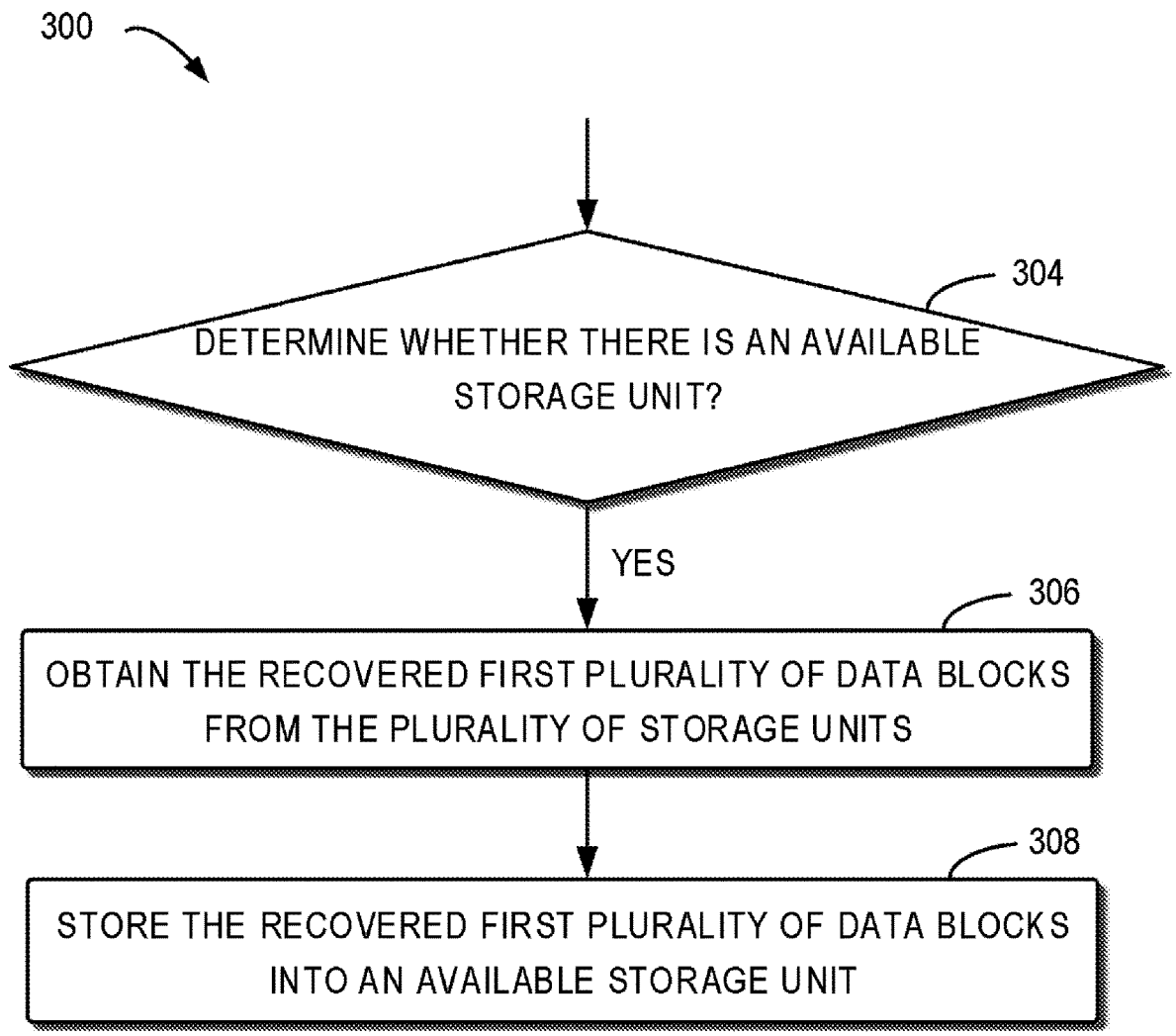
FIG. 3 illustrates a flowchart of a method 300 of recovering data and dumping data according to embodiments of the present disclosure.

The process of processing data has been disclosed above with reference to FIG. 2 in view of FIGS. 4A and 4B, and the process of storing the recovered data blocks using an available storage unit will be described in connection with FIG. 3 and FIGS. 4B and 4C.

At block 304, it is determined whether there is an available storage unit. In one example, when a new hardware storage resource is replaced or added, for example, a new disk. In this case, a new storage unit may be obtained. In another example, when the system for managing storage units is rebooted, it can be determined that the damaged storage unit is recovered. The above example is provided only for illustration, rather than suggesting any specific limitation to the scope of the present disclosure. Those skilled in the art may design any appropriate manner of obtaining an available storage unit, according to needs.

After obtaining the available storage unit, at block 306, a first plurality of data blocks are obtained from the plurality of storage units. Upon obtaining a new storage unit, it is required to store the recovered data in the new storage unit as soon as possible, thereby providing better security for the data. In addition, the redundancy of the disk can be reduced by means of adding a new storage unit to reuse the previous storage format.

As shown in FIG. 4B, when one of the 4 storage units is damaged, the data blocks are stored in the other three storage units. Although data can still be recovered if a further one of the three storage units is damaged, the safety is lowered. Moreover, as shown in FIG. 4B, the redundancy of 3 storage units (12+6) is 50%, while the redundancy of 4 storage units (12+4) is 33%. In order to reduce the overhead of the redundant data and ensure the safety of the data, the system needs a new storage unit, so as to change timely from the 12+6 format to the 12+4 format.

At block 308, the recovered first plurality of data blocks are stored into the available storage unit. When the recovered data blocks are stored to the new storage unit, the recovered data segments are read from the plurality of storage units. The read data segments are stored in the new storage unit. Then, the corresponding data segments and error correction blocks are removed from the plurality of storage units.

Figure 4C:
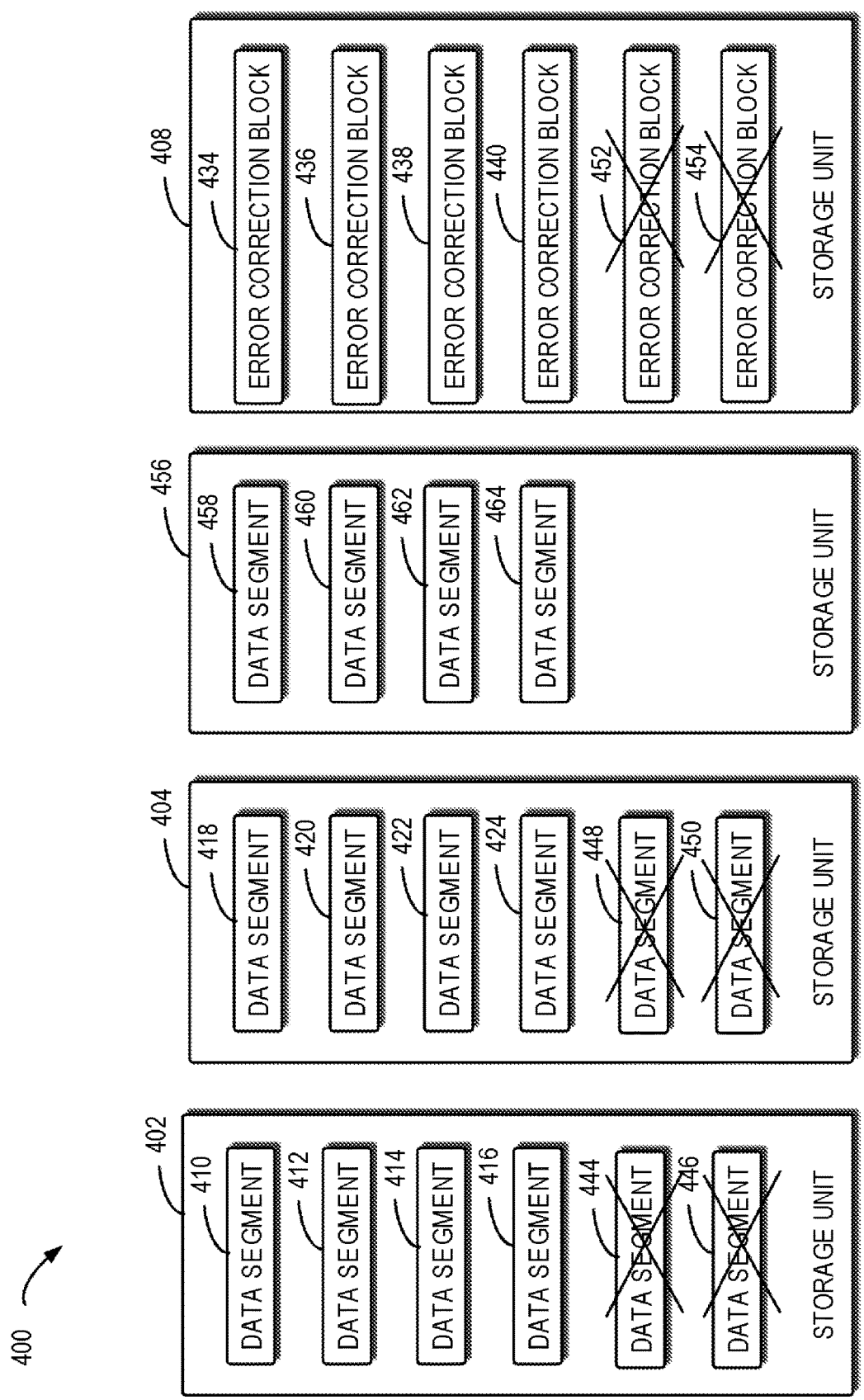

In the example as shown in FIG. 4C, the data segment 444, the data segment 446, the data segment 448 and the data segment 450 are read from the storage unit 402 and the storage unit 404. Then, the read data segments are stored in the new storage unit 456. The above data segments are stored in the storage unit 456 to form a data segment 458, a data segment 460, a data segment 462 and a data segment 464. Thereafter, the data segment 444, the data segment 446, the data segment 448 and the data segment 450 in the storage unit 402 and the storage unit 404, and the error correction block 452 and the error correction block 454 in the storage unit 408 are removed.

When the number of storage units is recovered to the original one, the technical solution of the present disclosure can reduce the number of I/O operations, and save the time of recovering to original data protection redundancy, thereby improving space consumption efficiency. For example, in the 12+4 encoding format, 12 data segments are read in the conventional solution. Then, 4 error correction blocks are recalculated, and the four recovered data segments and the 4 regained error correction blocks are rewritten. Hence, 12 read I/O operations and 8 write I/O operations are involved. As shown in FIGS. 4B and 4C, the solution of the present disclosure only requires 4 I/O operations for reading data segments and 4 I/O operations for writing data segments, and also avoids EC recalculation. Since the read I/O operations are reduced from 12 to 4, and the write I/O operations are reduced from 8 to 4, this solution saves a large number of I/O operations. For example, for the 12+4 encoding format, it saves 66.6% of read I/O operations and 50% of write I/O operations.

Figure 5:
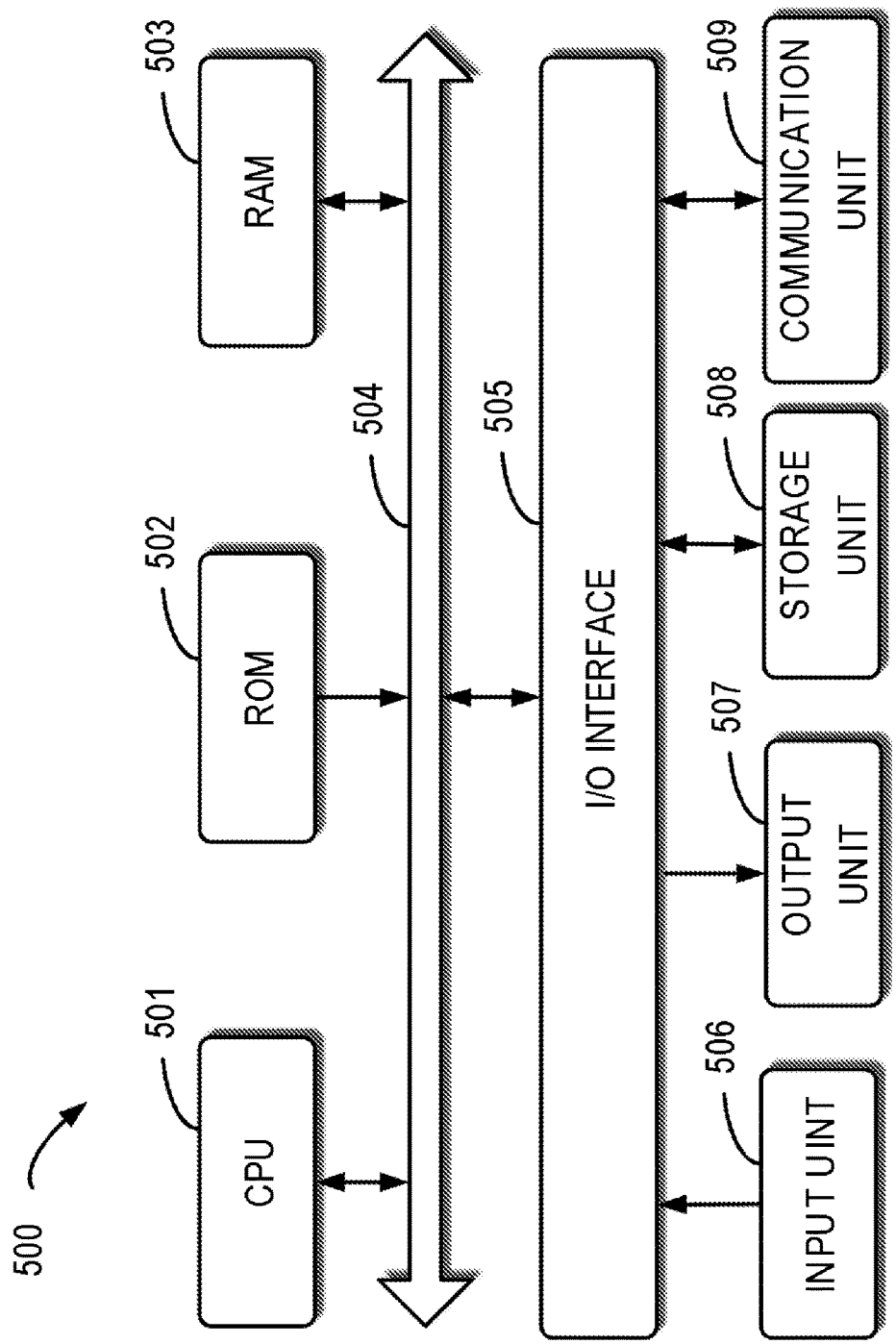
FIG. 5 illustrates a schematic diagram of an example device 500 can be used to implement embodiments of the present disclosure.

FIG. 5 illustrates a schematic diagram of an example device 500 that can be used to implement embodiments of the present disclosure. For example, any one of 101, 102, 104, 106 and 108 as shown in FIG. 1 can be implemented by the device 500. As shown, the device 500 includes a central processing unit (CPU) 501 that can perform various appropriate acts and processing based on computer program instructions stored in a read-only memory (ROM) 502 or computer program instructions loaded from a storage unit 508 to a random access memory (RAM) 503. In the RAM 503, there further store various programs and data needed for operations of the device 500. The CPU 501, ROM 502 and RAM 503 are connected to each other via a bus 504. An input/output (I/O) interface 505 is also connected to the bus 504.

A plurality of components in the device 500 are connected to the I/O interface 505 which includes an input unit 506, such as a keyboard, a mouse and the like; an output unit 507, such as various kinds of displays and a loudspeaker, etc.; a storage unit 508, such as a magnetic disk, an optical disk, and etc.; a communication unit 509, such as a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the methods 200 and 300, may be performed by the processing unit 501. For example, in some embodiments, the methods 200 and 300 may be implemented as a computer software program that is tangibly embodied on a machine readable medium, e.g., the storage unit 508. In some embodiments, part or all of the computer programs may be loaded and/or mounted onto the device 500 via the ROM 502 and/or communication unit 509. When the computer program is loaded to the RAM 503 and performed by the CPU 501, one or more acts of the methods 200 and 300 as described above may be performed.

The present disclosure can be a method, a device, a system and/or a computer program product. The computer program product may include a computer-readable storage medium on which computer readable program instructions are carried out for performing each aspect of the present application.

The computer-readable medium may be a tangible medium that may remain and store instructions for use by an instruction execution device. The computer-readable storage medium for example may be, but not limited to, an electronic, magnetic, optical, electromagnetic, semiconductor device, or any suitable combination of the foregoing. More specific examples (a non-exhaustive list) of the machine readable storage medium include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable program instructions described herein may be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the individual computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, an electronic circuitry including, for example, a programmable logic circuitry, field-programmable gate arrays (FPGA), or programmable logic arrays (PLA) may execute the computer readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, may be implemented by computer-readable program instructions.

These computer-readable program instructions may be provided to a processing unit of a general purpose computer, special purpose computer, or other programmable data processing apparatus to produce a machine, such that the instructions, when executed via a processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the function/act specified in the flowchart and/or block diagram block or blocks.

The computer-readable program instructions may also be loaded onto a computer, other programmable data processing apparatuses, or other devices to cause a series of operational steps to be performed on the computer, other programmable apparatuses or other devices to produce a computer implemented process, such that the instructions when executed on the computer, other programmable apparatuses, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of instruction, which comprises one or more executable instructions for implementing the specified logical function(s). In some alternative implementations, the functions noted in the block may occur out of the order noted in the figures. For example, two blocks shown in succession may, in fact, be performed substantially concurrently, or the blocks may sometimes be performed in a reversed order, depending upon the functionality involved. It will also be noted that each block in the block diagrams and/or flowchart, and combinations of blocks in the block diagrams and/or flowchart, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. Terminologies used herein were chosen to best explain principles of the embodiments, the practical application or technical improvement over technologies found in the marketplace, or to enable others of ordinary skill in the art to understand the embodiments disclosed herein.

We claim:

1. A method of processing data, comprising:
    maintaining, by a system comprising a processor, a first group of storage units, each storage unit of the first group of storage units storing a first group of data blocks, wherein the first group of data blocks of the first group of storage units are protected with first error correction blocks of the first group of storage units according to an error correction code in a first format;
    determining, by the system, that a first storage unit of the first group of storage units that stores the first group of data blocks is damaged, resulting in a second group of storage units that excludes the first storage unit;
    recovering, by the system, the first group of data blocks based on applying the first error correction blocks to a second group of data blocks of the second group of storage units, resulting in a recovered first group of data blocks;
    in response to performing the recovering, generating, by the system, second error correction blocks in a second format only for the recovered first group of data blocks by, the second format being different from the first format;
    determining, by the system, that a first portion of the second group of data blocks is damaged, resulting in a second portion of the second group of data blocks that excludes the first portion; and
    recovering, by the system, the first portion of the second group of data blocks based on applying the first error correction blocks and the second error correction blocks to the second portion of the second group of data blocks, wherein the second portion excludes the first portion of the second group of data blocks, resulting in a recovered first portion of the second group of data blocks.

2. The method of claim 1, further comprising:
    storing, by the system, the recovered first group of data blocks and the second error correction blocks into the second group of storage units.

3. The method of claim 2, wherein a total number of data blocks stored in each storage unit of the second group of storage units does not exceed a threshold number.

4. The method of claim 2, further comprising:
    in response to determining that there is an available storage unit of the second group of storage units, obtaining, by the system, the one or more recovered data blocks of the recovered first group of data blocks comprising the error correction code in the first format from the second group of storage units, and storing, by the system, the one or more recovered data blocks of the recovered first group of data blocks comprising the error correction code in the second format into the available storage unit.

5. The method of claim 4, further comprising:
in response to determining that the first storage unit that was damaged is recovered or detecting the new storage unit is added, determining, by the system, that there is the available storage unit.

6. A device, comprising:
a processor; and
a memory having computer program instructions stored thereon, the computer program instructions, when executed by the processor, causing the device to perform acts comprising:
maintaining a first group of storage units, wherein first data blocks of the first group of storage units are protected with first error correction blocks according to a first error correction code in a first format,
determining that a first storage unit of the first group of storage units that stores the first data blocks is damaged, resulting in second data blocks that omit the first data blocks,
recovering the first data blocks based on applying the first error correction code to the second data blocks, resulting in recovered first data blocks,
in response to performing the recovering, generating second error correction blocks for the recovered first data blocks by applying a second error correction code in a second format to the recovered first data blocks, the second format being different from the first format,
determining that a first portion of the second data blocks is damaged, resulting in a second portion of the second data blocks that excludes the first portion, and
recovering the first portion of the second data blocks based on applying the first error correction blocks and the second error correction blocks to the second portion of the second data blocks, wherein the second portion excludes the first portion of the second data blocks, resulting in a recovered first portion of the second data blocks.

7. The device of claim 6, the acts further comprising: storing one or more recovered first data blocks and the second error correction blocks into a second group of storage units.

8. The device of claim 7, wherein a total number of data blocks stored in each storage unit of the second group of storage units does not exceed a threshold number.

9. The device of claim 7, the acts further comprising:
in response to determining that there is an available storage unit, obtaining one or more recovered first data blocks comprising the first error correction code in the first format from the second group of storage units.

10. The device of claim 9, the acts further comprising:
in further response to the determining that there is the available storage unit, storing the one or more recovered data blocks of the recovered first group of data blocks comprising the second error correction code in the second format into the available storage unit.

11. The device of claim 10, the acts further comprising:
in response to determining that the first storage unit that was damaged has recovered or detecting that the new storage unit has been added, determining that there is the available storage unit.

12. The device of claim 6, wherein performing the recovering of the first data blocks comprises:
decoding, based on the first error correction code, the second data blocks of the second group of storage units to recover the first data blocks.

13. A non-transitory computer program product being stored on a computer-readable medium and comprising machine-executable instructions which, when executed, cause a machine to perform operations, comprising:
maintaining first storage units, first data blocks of the first storage units being protected with first error correction blocks of the first storage units according to a first error correction code in a first format;
determining that a first storage unit of the first storage units that stores first data blocks is damaged, resulting in second storage units that exclude the first storage unit;
recovering the first data blocks comprising applying the first error correction code to blocks of the second storage units, resulting in recovered first data blocks;
in response to performing the recovering, generating second error correction blocks for the recovered first data blocks by applying a second error correction code in a second format to the recovered first data blocks, the second format being different from the first format;
determining that a first portion of second data blocks of the second storage units is damaged, resulting in a second portion of the second data blocks of the second storage units that excludes the first portion; and
recovering, by the system, a first portion of the second data blocks based on applying the first error correction blocks and the second error correction blocks to the second portion of the second data blocks, wherein the second portion excludes the first portion of the second data blocks, resulting in a recovered first portion of the second data blocks.

14. The non-transitory computer program product of claim 13, wherein the operations further comprise:
storing the one or more recovered data blocks of the recovered first data blocks and the second error correction blocks into the second storage units.

15. The non-transitory computer program product of claim 14, wherein a total number of data blocks stored in each storage unit of the second storage units does not exceed a threshold number.

16. The non-transitory computer program product of claim 14, wherein the operations further comprise:
in response to determining that there is an available storage unit of the second storage units, obtaining the one or more recovered data blocks of the recovered first data blocks comprising the first error correction code from the second storage units.

17. The non-transitory computer program product of claim 16, wherein the operations further comprise:
in further response to the determining that there is the available storage unit of the second storage units, storing the one or more recovered data blocks of the recovered first data blocks comprising the second error correction code into the available storage unit.

18. The non-transitory computer program product of claim 17, wherein the operations further comprise, based on creation of a new storage unit, moving, by the system, one or more recovered data blocks of the recovered first data blocks from an undamaged storage unit to the new storage unit.

19. The non-transitory computer program product of claim 13, wherein the recovering the first data blocks comprises:

decoding, based on the first error correction code, the second data blocks to recover the first data blocks.

20. The method of claim 1, further comprising:

storing, by the system, the first error correction blocks and the second error correction blocks in a second storage unit of the second storage units.

\* \* \* \* \*